(12) United States Patent
Beauviala et al.

(10) Patent No.: US 6,215,544 B1
(45) Date of Patent: *Apr. 10, 2001

(54) MOVING PICTURE FILM CAMERA AND FILM REEL HOUSING DEVICE

(75) Inventors: Jean-Pierre Beauviala, Grenoble; Yves Riviere, Seyssinet Pariset, both of (FR)

(73) Assignee: Aaton, Grenoble (FR)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/202,912
(22) PCT Filed: Jun. 27, 1997
(86) PCT No.: PCT/FR97/01159
§ 371 Date: May 10, 1999
§ 102(e) Date: May 10, 1999
(87) PCT Pub. No.: WO98/00753
PCT Pub. Date: Jan. 8, 1998

(30) Foreign Application Priority Data

Jun. 28, 1996 (FR) .................................................. 96 08299

(51) Int. Cl.⁷ .............................. G03B 23/02; G03B 1/00
(52) U.S. Cl. ............................................. 352/72; 352/156
(58) Field of Search .............................. 352/72, 73, 74, 352/78 R, 242, 243, 244, 156

(56) References Cited

U.S. PATENT DOCUMENTS

| | | | | |
|---|---|---|---|---|
| 3,475,089 | * | 10/1969 | Funck | 352/156 |
| 3,627,229 | * | 12/1971 | Wangerin | 242/332 |
| 3,627,230 | * | 12/1971 | Wangerin | 242/332 |
| 4,767,079 | * | 8/1988 | Saito et al. | 242/336 |
| 5,871,167 | * | 2/1999 | Beauviala | 242/345.1 |

* cited by examiner

Primary Examiner—Russell Adams
Assistant Examiner—Rodney Fuller
(74) Attorney, Agent, or Firm—Arthur L. Plevy; Buchanan Ingersoll PC

(57) ABSTRACT

A housing device for coaxial reels of motion picture film, intended to be associated with an optical block of a film camera is provided, including: a stage housing the reels and defining a space for guiding rollers for guiding the film in a loop between the reels and a rear presser intended to face a filming window of the optical block, each reel including two circular flanges for axially holding the film around a core; a main axis intended to cooperate with the cores; two secondary axes each supporting a film return idler and separating disks for separating the flanges of a reel; and a control unit for defining a relative motion between the secondary axes and the reels, between an idle position where the secondary axes are radially distant from the reels and an active position where the separating disks separate the periphery of the flanges in a determined region, fixed with respect to the housing device.

15 Claims, 6 Drawing Sheets

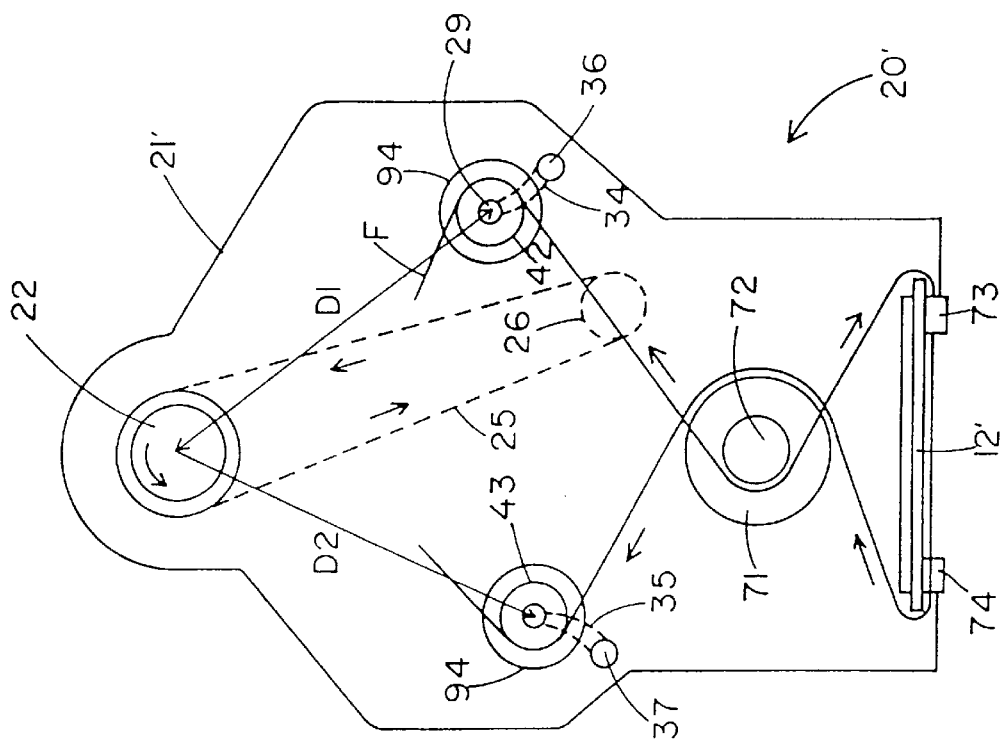
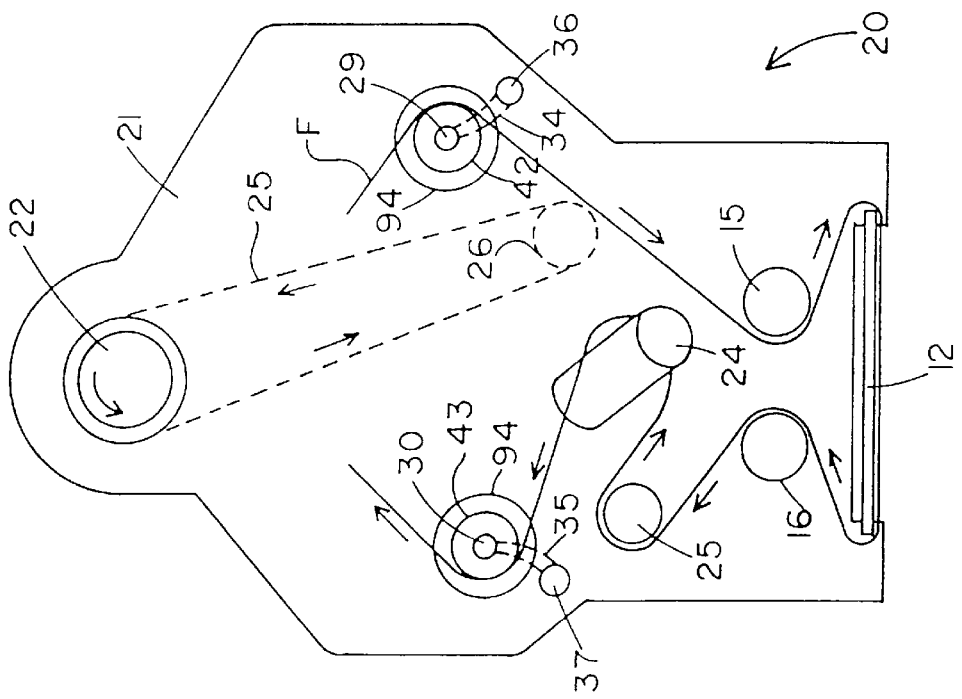
Fig 8
Fig 7

MOVING PICTURE FILM CAMERA AND FILM REEL HOUSING DEVICE

The present invention relates to motion picture film cameras. It more specifically applies to realizing a coaxial motion picture film reel housing device, to be associated with an optical block of a camera and containing a mechanism for driving and guiding the film, in a loop, between the reels and a rear presser facing a filming window of the optical block. The present invention more specifically relates to motion picture films, for example 16 or 35 mm films.

For such films, the film camera is conventionally associated with a magazine containing a film drive mechanism and defining film reel carrying compartments. The raw film is unwound from a supply reel engaged on an axis of a supply compartment to a filming optical system, guided by rollers of the magazine. The exposed film is wound on a take-up reel engaged on a motor driven axis of a take-up compartment of the magazine. Due to the large footage of film generally used in this type of camera, the supply and take-up reels are generally coaxial and wound on cores which cooperate with coaxial axes, respectively a supply and a take-up axis, linked to the magazine.

A disadvantage of conventional magazines is that the loading of a raw reel into the magazine and the unloading of an exposed reel require total darkness. Indeed, the loading of a raw reel is performed flat by engaging a first core, on which the film has been wound at its manufacturing, onto the supply axis of the magazine. The film leader is then engaged in the magazine rollers to be guided to a rear presser associated with a filming window of the optical block. The leader is then brought back, from the rear presser, to a second empty core, engaged on the take-up axis of the magazine and to which the leader is attached. Even though the magazine can be closed as soon as the raw reel has been placed on the supply axis and the leader engaged in a dedicated slot, the supply compartment being isolated from the rest of the magazine, the mere fact of having to place an unprotected reel in the supply compartment causes a risk of veiling the raw film. The unloading of an exposed film is performed by opening the take-up compartment and by extracting the core on which the exposed film reel is wound. The unloading is thus performed, like the loading, flat and without protection of the exposed film from light.

To enable a loading or an unloading of the magazine out of the daylight, the optical block of the camera, which includes the drive mechanism actuating means, is generally dissociated from the magazine comprising the actual drive mechanism. Indeed, 35-mm, or even 16-mm, films, are often used for filming feature films which requires the use of several film reels. Now, such filming is not necessarily performed in a studio and is thus often distant from a dark room enabling the secure loading or unloading of the magazine. Thus, this generally leads to having several magazines loaded in advance to film in acceptable security conditions for the film reels. However, the magazine drive mechanism is a particularly expensive system due to the noiseless operation it must have and to the accuracy with which it has to be made. To provide several magazines is thus expensive.

Another disadvantage of conventional magazines is that the contact of the film with the walls of the supply and take-up compartment is a source of noise due to a rubbing of the film during the core rotation. Indeed, it is important to ascertain that the windings of the film remain well superposed. The compartments are thus dimensioned accordingly. It is then generally necessary to provide acoustic damping means within the surfaces of the supply and take-up compartments, which further increases their cost and complexity.

U.S. Pat. No. 3,475,089 describes an 8-mm motion picture film camera. In an embodiment, two film reels are received coaxially in a magazine. Each reel includes two circular flanges for maintaining the film axially around the core. If the use of such circular flanges enables maintaining an axial clearance between the magazine walls and the reels to cancel the noise source due to the rubbing of the film against these walls, a new noise source is introduced due to the rubbing of the film when exiting one reel and entering into the other through their respective peripheries. Further, this noise increases with the unwinding film speed, which makes this solution impossible to apply to 16-mm films, and even less applicable to 35-mm films. In another embodiment, the film is housed in a cartridge receiving two coaxial reels. The same film rubbing problems as those discussed hereabove in relation with the walls of a magazine, arise with the walls of a cartridge. Further, if the use of a cartridge protects the film from an exposure to light in magazine loading or unloading steps, a new source of noise is introduced. Indeed, the film necessarily is in contact with elements linked, fixedly or pivotally, to cartridge walls, which constitutes a noise source due to the manufacturing tolerances in connection with the manufacturing of a disposable cartridge. Further, if the rear presser is contained in the cartridge, an optimal positioning in front of the filming window of the optical block cannot be guaranteed.

Some cameras are provided with magazine identification means for enabling the user to know the characteristics of the film contained therein. At the loading of a raw film reel in a magazine, the user configures a characterization device comprised in the magazine, for example, by means of switches. The camera then includes means for extracting the information contained in the characterization device when the magazine is associated thereto. The information which may be entered therein is, for example, the magazine number, the film sensitivity, the reel length, etc. The camera can store the information relative to several magazines. Throughout the filming, the camera decrements the information relative to the film length, to know, permanently, the remaining raw film length. When the user changes magazines, for example, to use a film of different sensitivity, the camera extracts from its memory all the information relative to this magazine, that it recognizes by its number, if said magazine has already been used. Thus, the user knows, by introducing this previously-used magazine into the camera, what film length remains available.

The present invention provides a coaxial film reel housing device for, respectively, raw film and exposed film, which cancels any noise generation while enabling an axial maintaining of the film around the respective reel cores.

The present invention also provides a cartridge housing device, for containing two coaxial film reels and dissociated from the reel driving and guiding mechanism, which ensures an optimal positioning of the film in front of a rear presser of a film camera to which it is associated.

The present invention also provides such a housing device which enables the film, in a use position, to be neither in contact with the cartridge walls, nor with elements connected, fixedly or pivotally, to the cartridge walls.

The present invention also aims at preventing the film from escaping radially from each reel except from a predetermined region of the magazine or of the cartridge.

The present invention also aims at enabling the film to be wound or unwound from this predetermined region only when the reel is in a use position.

The present invention also provides such a housing device which can be associated with a conventional optical block of a film camera.

The present invention also aims at making the housing device form an adapter between a same cartridge and different types of conventional camera optical blocks.

The present invention further aims at enabling an automatic identification by the camera of characteristics of the film contained in the cartridge.

To achieve these objects, the present invention provides a device for housing coaxial motion picture film reels, intended to be associated with an optical block of a film camera, including:

a stage for housing the reels and defining a space for means for guiding the film in a loop between the reels and a rear presser intended to face a filming window of the optical block, each reel including two circular flanges for axially holding the film around a core;

at least one main axis intended to cooperate with at least one of the cores;

two secondary axes, each supporting a return idler of the film and means of separating the flanges of a reel; and means for defining a relative motion between the secondary axes and the reels, between an idle position where the secondary axes are radially distant from the reels and an active position where the separating means separate the periphery of the flanges in a determined region, fixed with respect to the housing device.

According to an embodiment of the invention, each secondary axis pivotally supports a return idler, axially placed between two disks forming the separating means, also pivotally mounted on the secondary axis, independently from the return idler.

According to an embodiment of the invention, the diameter of the disks is greater than the diameter of the idler to which they are associated.

According to an embodiment of the invention, each flange includes, at its periphery, a tapered edge adapted to forming a bearing surface for a disk of a secondary axis, the tapered edges of the two flanges of a same reel facing each other.

According to an embodiment of the invention, at least one disk of a reel is motor driven.

According to an embodiment of the invention, at least one return idler is motor driven and includes film traction means.

According to an embodiment of the invention, the main axis is motor driven, the return idler and the disks rotating freely independently from one another on the secondary axes.

According to an embodiment of the invention, the reels are contained in a cartridge provided with curtains movable between a closed position where they define slots of communication between the outside and the inside of the cartridge and an open position where they define openings for introducing at least partially the separating disks of the flanges.

According to an embodiment of the invention, the device includes operating means, accessible from the outside, for controlling the simultaneous opening and the simultaneous closing of the curtains of the cartridge.

According to an embodiment of the invention, the operating means simultaneously lock a closing cover of the space housing the guiding means.

According to an embodiment of the invention, the device includes means, accessible from the outside, for controlling radial motions of the secondary axes or of the main axis between the idle and active positions.

According to an embodiment of the invention, the device is removable from the optical block, the guiding means being formed of rollers supported, at least some of them, by the stage, wherein the realization and the positioning of said rollers supported by the stage depends on the optical block for which the housing device is intended while the position of the main and secondary axes depends on the cartridge for which the housing device.

According to an embodiment of the invention, the device includes a device for optically reading a label showing characteristics of the film contained in the cartridge and affixed on an external surface thereof, the stage including a port arranged to face the label, and an optical reading rod associated with the housing device being adapted to travel in front of this port.

The present invention also relates to a film camera for a motion picture film including an optical block associated with motor drive means for a film drive mechanism including housing means for a removable cartridge containing the film in the form of a first raw film reel and of a second exposed film reel, the reels being coaxial and the housing means including means arranged to cooperate with movable elements contained in the cartridge so that, in a work position, neither the film, nor a movable element with which the film is in contact, is in contact with a fixed element of the cartridge.

The foregoing objects, features and advantages of the present invention will be discussed in detail in the following non-limiting description of specific embodiments in connection with the accompanying drawings.

FIG. 7 is an elevation view of a first embodiment of a device according to the present invention for housing a motion picture film cartridge;

FIG. 8 is an elevation view of a first embodiment of a housing device according to the present invention;

For clarity, only those elements necessary to the understanding of the present invention are shown in the drawings. For the same reasons, same elements are designated with same references in the different drawings and the drawings are not to scale.

A feature of the present invention is to provide, within the housing device, means for separating the periphery of circular flanges for axially holding film reels in a predetermined region, fixed with respect to the housing device. According to a first aspect of the present invention, means are provided for enabling relative motion between the separating means and the reels, between an idle position where these separating means are distant from the film reel holding flanges, and an active position where they space apart the flange periphery.

A feature of a second aspect of the present invention is to dissociate the functions of a conventional film camera magazine. According to the present invention, the actual function of the magazine is transferred to a cartridge while the functions of film driving and guiding to a filming window of the optical block of the camera are transferred to a cartridge holder.

Another feature of the present invention is that all elements for guiding the film during filming are contained in the housing device.

Figure 1:
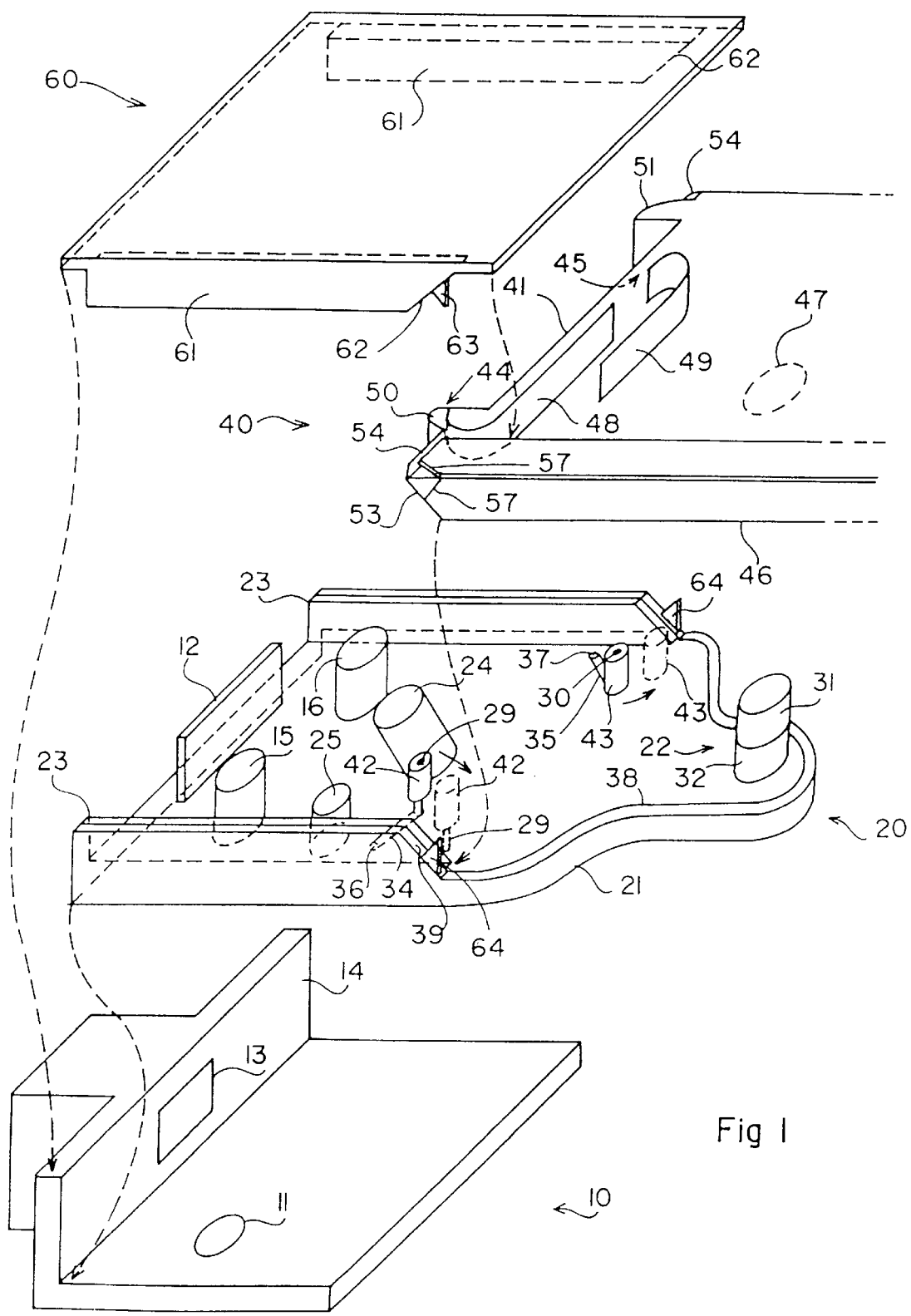
FIG. 1 is an exploded perspective view of a film camera according to an embodiment of the present invention.

FIG. 1 schematically shows in exploded perspective view a camera according to an embodiment of the present invention. In the example shown, the camera is a cartridge camera, that is, the housing device is intended to receive a film cartridge and not free reels. It should however be noted that most of the features of the present invention which will be described hereafter also apply to the case where the housing device is intended for receiving two free film reels.

Optical block 10 is a conventional film camera optical block. It will only be reminded that it is provided with motor drive means 11 for a drive mechanism which is associated with housing device 20. The coupling between motor drive means 11 and the drive mechanism is, for example and conventionally, a magnetic or gear coupling.

Housing device 20 is, according to the present invention, intended to receive all the components of a conventional magazine which guide the film towards a rear presser 12 to present a film portion in front of a filming window 13 of block 10. Device 20 is formed of a stage 21 in the thickness of which are integrated, conventionally, drive means (not shown), for example, for a main axis 22. The drive means are coupled, for example, magnetically, with motor drive means 11. Two lateral walls 23 define, with a back wall 14 of block 10 and a front wall 41 of a cartridge 40, a space in which are contained means for guiding the film from cartridge 40 to rear presser 12. In the example shown in FIG. 1, rear presser 12 and four guiding rollers 15, 16, 24 and 25 are associated with device 20. Rollers 15 and 16 are generally rotated by the drive mechanism (not shown).

Stage 21 is attached to optical block 10 in the same way as a conventional magazine and includes, for this purpose, similar means (not shown).

According to the present invention, device 20 also includes two return idlers, respectively 42 and 43, mounted on secondary axes, respectively 29 and 30. According to the shown embodiment, axes 29 and 30 are mounted individually to a first end of a lever, respectively 34 and 35, the other end of which is connected to a pivoting axis, respectively 36 and 37. Axes 36 and 37 are parallel to axes 29 and 30 so that a rotation of axes 36 and 37 causes a displacement of idlers 42 and 43 between idle and active positions, shown, respectively, in full and dotted lines in FIG. 1. It should however be noted that other displacement means of the secondary axes may be provided, for example shifting means.

According to the present invention, secondary axes 29 and 30 also support separating means for circular flanges (not shown in FIG. 1) for axially maintaining the film in a reel. Thus, in the embodiment shown in FIG. 1, the separating means are movable between an idle position, where they do not disturb the introduction of the cartridge onto the housing device (or of the free reels into the magazine formed by the housing device) and an active position where they cooperate with the periphery of the reel flanges in a determined region, fixed with respect to the housing device. This feature of the present invention will be better understood in relation with FIGS. 4A and 4B which will be described subsequently.

A feature of the present invention is that idlers 42 and 43 are independent, in rotation, with respect to the separating means which are also supported by axes 29 and 30. As an alternative, not shown, axes 29 and 30 are fixed and axis 22 is movable between the idle and active positions. In this case, the motion of axis 22 causes the motion of the reels (and, if present, of the cartridge) that it supports with respect to the separating means. The motion communicated to axis 22 is here, preferably, a shifting according to the median passing through axis 22 of the triangle defined by axes 22, 29 and 30.

Cartridge 40 defines two recesses of identical sizes for film reels (not shown). A first recess, distal from bottom 46, is intended to receive a raw film reel wound on a first core (not shown). A second recess, proximal to bottom 46, is intended to receive an exposed film reel winding around a second core coaxial to the first core. A leader of the raw reel is attached, for example glued, to the second core after formation of a loop coming out of cartridge 40 through a slot 44 and entering therein through a slot 45. The film is thus intended to be mounted in a loop in the path defined by rollers 15, 16, 24, and 25 and rear presser 12. Each idler 42 or 43 is associated with one of the two reels to return the film from this reel to the roller, respectively 24 or 16. Although in FIG. 1, cartridge 40 is shown as being generally rectangular, it may have any other shape, for example, a circular shape. Further, the reels may be exchanged, that is, the raw film supply reel may be proximal to bottom 46, the take-up core being distal from bottom 46.

According to the described embodiment of cartridge 40, said cartridge includes, in its front portion 41, two curtains 48 and 49 movable between a closed position (such as shown in FIG. 1) where they define slots 44 and 45 with rounded walls, respectively 50 and 51, of the cartridge, and an open position where they free access openings 52 (FIGS. 4A and 4B) for the separating means and idlers 42 and 43. This feature will be better understood in relation with FIGS. 4A and 4B.

Bottom 46 of cartridge 40 is provided with an opening 47 letting through axis 22. Axis 22 has a structure similar to that of a central axis of a conventional magazine. For example, a first portion 31 of axis 22, intended to cooperate with the first core supporting the raw film reel, rotates freely, or even with slight friction. A second portion 32 of axis 20, intended to cooperate with the second core supporting the exposed film reel is motor driven to pull the film.

Since the two reels are in different planes, axis 29 associated with idler 42 is longer than axis 30 associated with idler 43.

The reels of cartridge 40 which are intended to move as the film is driven are housed with an axial and radial clearance in cartridge 40. Further, they are not in contact with fixed elements of the cartridge when the film is in motion, that is, when axes 29 and 30 are in the active position, curtains 48 and 49 being open. Thus, when in motion, the film is not in contact with elements, fixed or rotating, connected to the cartridge walls.

When cartridge 40 is in a work position in housing device 20, axes 22, 29, and 30 ensure an axial and radial positioning of the reels and of the film with respect to rollers 15, 16, 24, and 25. The positioning reference is thus given, according to the present invention, by device 20. Device 20 and cartridge 40 may then be used together like a conventional magazine.

Stage 21 further includes means 38 blocking any light between device 20 and cartridge 40. Indeed, when cartridge 40 is in the work position, the portion of film which travels between rollers 15, 16, 24, and 25 must not be exposed to light other than through filming window 13 of optical block 10. A connection which blocks any light is thus provided according to the present invention between cartridge 40 and device 20. The light blocking means are, for example, formed of a seal 38 which is crushed by a rib (not shown) provided in bottom 46. The path of the seal depends on the shape of cartridge 40 for which is intended device 20 according to the present invention. Here, the seal path is exterior to axes 22, 29, and 30 so that the impenetrable area that it defines encompasses opening 47 and front openings 52 (FIG. 4A) of cartridge 40.

A cover 60 of housing device 20 closes the space containing rollers 15, 16, 24, and 25 and rear presser 12 to protect the film loop from light. According to the present invention, cover 60 covers, at least partially, cartridge 40 to perfect the light sealing. Cover 60 preferably includes, like stage 21, in its surface directed towards cartridge 40, light sealing means adapted to cooperate with corresponding means (not shown) of the outside of cartridge 40.

According to a preferred embodiment, seal 38 extends beyond walls 23 of device 20 to cooperate with corresponding means provided on the free ends of lateral walls 61 and 62 of cover 60. Preferably, the transition followed by seal 38 between walls 23 and stage 21 is slanted, which eases the seal assembly and guarantees a better impenetrability at its folds. Thus, walls 23 and 61 end, on the cartridge side, by ramps, respectively 39 and 62. These ramps are intended to cooperate with front edges, respectively 53 and 54, of cartridge 40 which have a complementary shape. The sealing rib is preferably continuous from one surface of the cartridge to the other by connecting both surfaces via edges 53 and 54.

Figure 2:
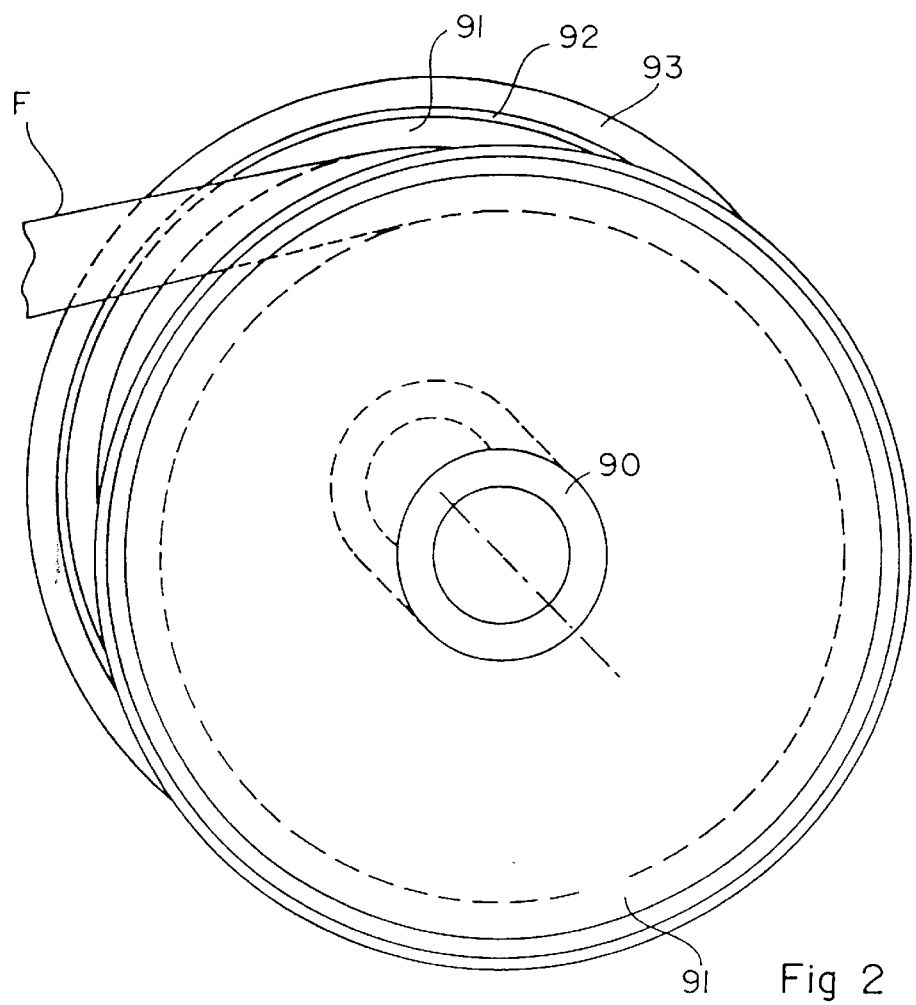
FIG. 2 is a perspective view of a film reel provided with axial hold flanges according to the present invention.
Figure 3:
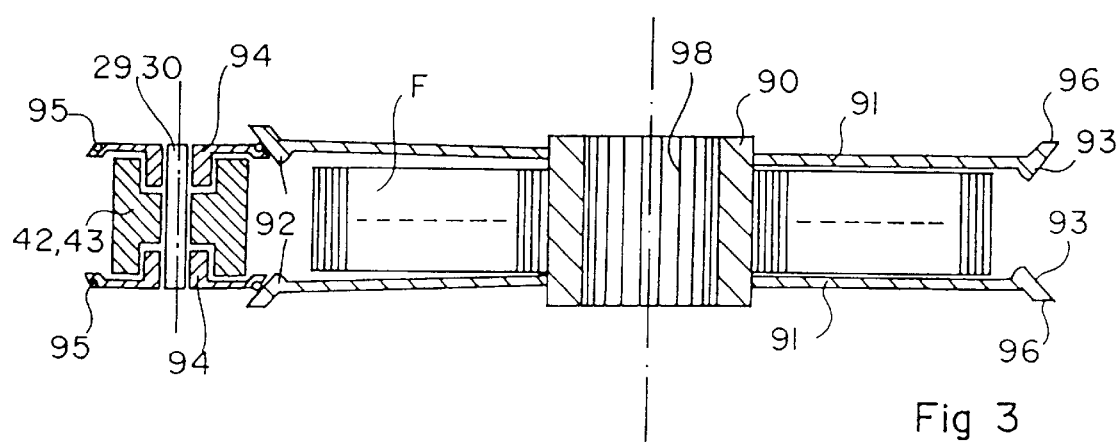
FIG. 3 is an axial cross-sectional view of a film reel such as shown in FIG. 2, associated with a separating means of a housing device according to the present invention.

FIGS. 2 and 3 show an embodiment of circular flanges for holding the film in a spool according to the present invention. FIG. 2 is a perspective view of a film reel. FIG. 3 is an axial cross-sectional view of the reel shown in FIG. 2 in the work position, illustrating an embodiment of a return idler and of separating means supported by axis 29 or 30.

As can be seen in these drawings, the present invention provides to associate with a core 90 for receiving a wound motion picture film F, two axial holding flanges 91. The two flanges 91 are, for example, formed of two resilient plastic disks which are connected to the two longitudinal ends of core 90.

In addition to axially holding film F on core 90, flanges 91 protect the film from dust and, if they are made of an opaque material, from light.

Each flange 91 includes, in the vicinity of its internal periphery, a radially holding peripheral cusp 92. Cusps 92 are used to hold film F inside flanges 91 by preventing it from coming out by the reel periphery.

Preferably, flanges 91 are, at their periphery and when idle, slightly bent towards the inside of the reel. The choice of a shape slightly bent to the inside of the flanges 91 guarantees the desired effect in a series manufacturing by injection of plastic material. Indeed, flanges 91 have a very large diameter with respect to their thickness and with respect to the diameter of the core to which they are attached. The diameter of flanges 91 (up to several ten centimeters) is set by the maximum film length to be wound. The flange thickness is chosen to be relatively thin (on the order of one millimeter) so that they may resiliently deform. Manufacturing plane flanges may result in flanges having a periphery bent towards the outside. The film would then no longer be radially held and may accidentally unwind during storage.

At its periphery, each flange 91 has an edge 93 tapered towards the other flange of the reel. Tapers 93 are intended to cooperate with separating disks 94 supported by axis 29 or 30. Each axis 29 or 30 receives, in addition to idler 42 or 43, two coaxial separating disks 94 axially framing idler 42 or 43. Disks 94 are intended to separate the edges of flanges 91 by bearing against tapers 93 when levers 34 and 35 have pivoted to the work position. For example, the peripheries of disks 94 hold a ring seal 95 improving the rotating link between disks 94 and flanges 91. Edge 93 of each flange 91 has a sufficient axial height to form a bearing surface for the edge of disk 94 from the position where it contacts edge 93 to the active position where the flanges are separated. Further, the slanting of the bearing surface created by tapered edges 93 guarantees a punctual contact with the periphery of disks 94 to avoid any friction.

The external end of each edge 93 defines an external overhang 96 with respect to the plane of flange 91. Overhang 96 cooperates, with radial and axial clearance, with a concentric rib (not shown) realized on the internal surface of bottom 46 of cartridge 40, to form a trap for the light which is likely to enter through opening 47 when cartridge 40 is in storage position out of housing device 20.

Since flanges 91 are linked to core 90, they are rotated therewith. Thus, when separators 94 are in the active position, the film may be unwound, or wound, by coming out of or entering between flanges 91 in the region of idler 42 or 43. A single region for coming in or out of the reel is thus imposed to the film.

By their resilience, flanges 91 return to their rest position where they prevent film F from coming out of the other peripheral areas. Thus, even when separators 94 are in the active position, any axial misalignment of film F and any extraction of the film is prevented elsewhere than from the region of separators 94.

Preferably, the diameter of disks 94 is substantially greater than the diameter of idlers 42 and 43. Thus, disks 94 form both a separating means of flanges 91 and an axial positioning means of film F around idlers 42 and 43. A suitable positioning of the film conveyed back to rollers 24 and 16 is then guaranteed.

Another advantage of the present invention is that any generation of noise as the film comes out in the determined reel region is avoided. Indeed, any rubbing of the film with the periphery of flanges 91 is canceled and, since flanges 91 are pivotally linked to disks 94 and the latter are independent in rotation from idlers 42 or 43, there is no rubbing likely to generate noise.

According to the embodiment shown, axis 22 is motor driven and idlers 42 and 43 as well as disks 94 freely rotate with respect to axes 29 and 30. As an alternative, portions 31 and 32 of axis 22 rotate freely. In this case, at least one disk 94 associated with the take-up reel is motor driven. Similarly and preferably, at least one of idlers 42 and 43 is then motor driven (at a speed different from that of disk 94) and includes film traction means (for example teeth). Possibly, both idlers 42 and 43 are motor driven and/or disks 94 of the take-up reel are motor driven while disks 94 of the take-up reel are slightly braked. The choice of the embodiment depends, in particular, on optical block 10. For example, driving idlers 42 and 43 may function as rollers 15 and 16 in a camera having its optical block associated with a housing device designed so that the film directly passes from the cartridge to two rollers forming motor driven idlers for both guiding the film to the rear presser and returning it therefrom.

According to the present invention, the motion of the return idlers and of the separating means (or of axis 22) is performed by means of a control unit accessible from the outside of the housing device, for example, at the back of stage 21 in a portion protruding from optical block 10 opposite the filming window. These separating means may also be made accessible from the outside of cover 60.

Figure 4A:
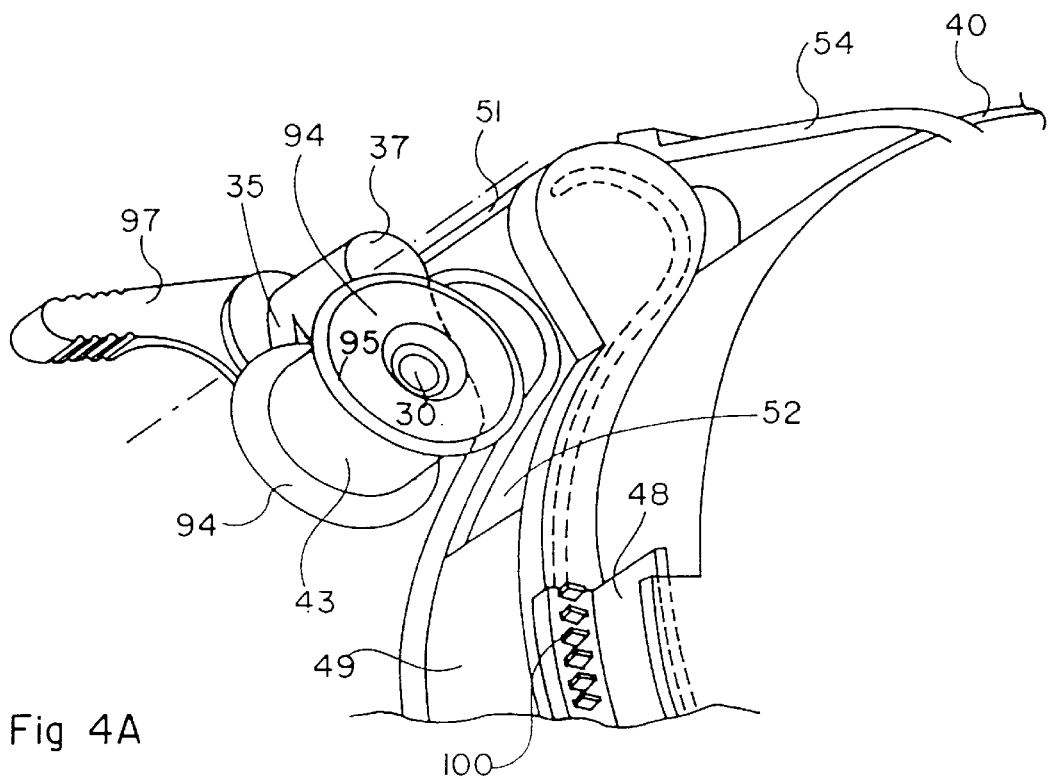
FIGS. 4A and 4B show a detail of a cartridge and of film return and reel flange separating means, respectively in an idle position and in an active position.
Figure 4B:
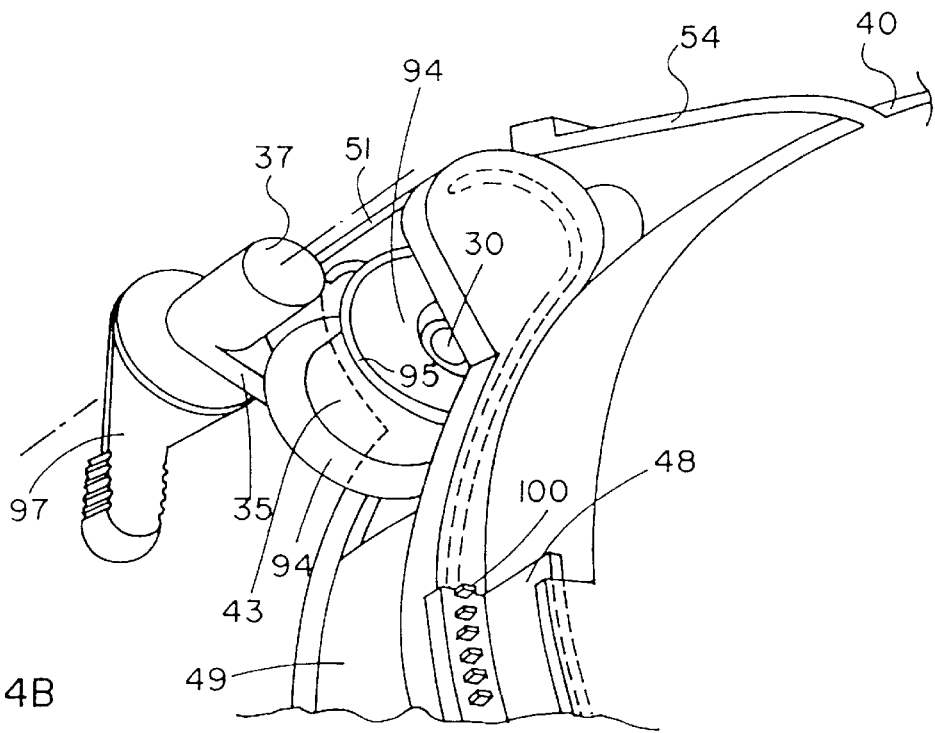

FIGS. 4A and 4B show an embodiment of this control unit, respectively, in an idle position and in a control position, applied to a pivoting of axes 29 and 30. These drawings show, in perspective, a detail of cartridge 40 in the vicinity of idler 43. For clarity, housing device 20 has not been shown in FIGS. 4A and 4B.

The control unit is, for example, formed of a lever 97 for rotating axis 37 which passes through stage 21. Curtains 48 and 49 are shown in their open position, that is, they do not define gates 44 and 45 with walls 50 and 51, but they delimit openings 52 (a single opening is shown in FIGS. 4A and 4B). It is thus assumed that the film (not shown) has already been mounted in a loop over the rear presser and that cover 60 is in place. In the idle position of lever 97 (FIG. 4A), disks 94 are slightly distant from opening 52. In the active position (FIG. 4B), disks 94 and idler 43 at least partially penetrate into cartridge 40 through opening 52 so that disks 94 separate the flanges from the spool. The penetration depth of the return idlers into the cartridge depends on the radial clearance between the cartridge and flanges 91. Even axis 30 may penetrate into the cartridge, provided that opening 52 is adapted to the axis height and to the thickness of lever 35.

It should be noted that the film path is not modified by setting idler 43 in the work position. Indeed, the film is mounted in a loop over rear presser 12 while curtain 49 is closed and defines, with curved wall 51, a means for deviating the film from the reel to roller 16. In the work position, idler 43 performs the return function previously performed by the curtain. The same operation is reproduced for idler 42, roller 24 and curtain 48.

According to the present invention, housing device 20 includes means for operating curtains 48 and 49 from the outside of the device. Preferably, these means simultaneously control the locking of cover 60 in closed position to hold the cartridge and forbid any opening of the cover, and thus any accidental exposure of the film as long as curtains 48 and 49 are open.

Figure 5:
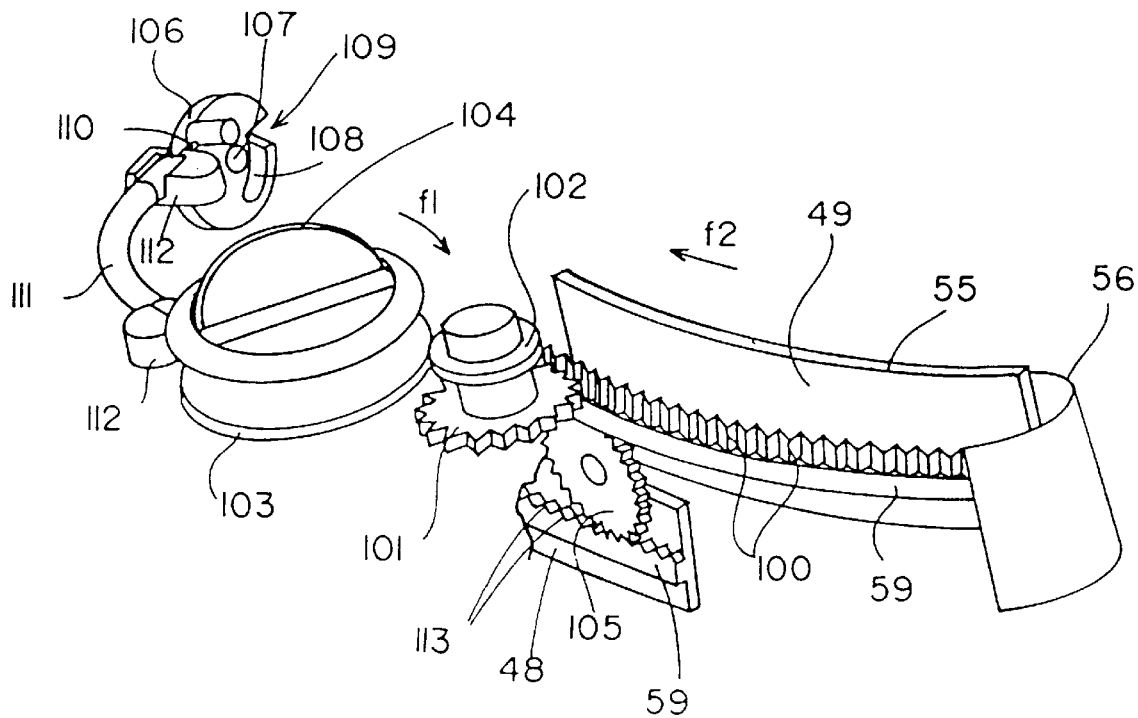
FIG. 5 shows a perspective view of means for operating curtains of a cartridge and for locking a cover of the housing device according to the present invention.

FIG. 5 illustrates an embodiment of a curtain operation and cover locking means. For clarity, this drawing only shows the operating means, in a perspective view illustrating curtains 48 and 49 in closed position. The view is taken from the back of stage 21.

Curtain 49 includes, in an external shoulder 59, a gear 100 cooperating with a toothed wheel 101. Toothed wheel 101 is coaxially pivotally connected to a wheel 102 driven by a disk 103 manually operated by means of an axis (not shown) passing through stage 21 and rotated by a manual control unit 104. The pivotal connection of wheel 102 and of disk 103 is performed, for example, by means of teeth (not shown). Giving a rotating motion, for example one half-turn, to unit 104 in the direction indicated by arrow f1, results in the opening of curtain 49 in the direction indicated by arrow f2. The function of wheels 101 and 102 is to provide a down gearing so that a rotation of one half turn of disk 103 moves curtain 49 along the desired length.

Opposite to gear 100 in the height of shoulder 59 are means 113 for cooperating with a toothed wheel 105 pivotally connected to front wall 41 of the cartridge to transmit the motion to curtain 48 which also includes means 113 for engaging with wheel 105. It should be noted that both curtains are simultaneously moved in opposite directions.

As can be seen in FIG. 5, curtain 49 has a thicker portion 55 for masking opening 52 by passing in front of front wall 41 and a thinner portion 56 for following the deformation imposed by circular wall 51 of small radius.

The locking of cover 60 is performed, for example, by means of a cable transmission of the rotation of unit 104 to a cover locking pellet 106 pivotally mounted around an axis 107. Pellet 106 includes a circular port 108 communicating with a peripheral opening 109. Opening 109 is intended to receive a stud (not shown) protruding from the internal surface of cover 60. The stud is intended to engage into opening 109 and to be blocked in port 108 once pellet 106 has turned around axis 107. This locking means forms a conventional locking means in the field of mechanics.

A first end of cable 110 is attached to pellet 106. The cable is guided in a sheath 111, the respective ends of which are received in blocking elements 112. The other end of cable 110 is attached to the rotation axis of disk 103. The amplitude of the rotation communicated to pellet 106 depends on the external diameter of the rotation axis on which the cable is wound, on the side of operating unit 104.

Preferably, stage 21 and cover 60 include, in planes shifted with respect to walls 23 and 62, protrusions, respectively 64 and 63 (FIG. 1), of generally triangular shape and intended to cooperate with grooves of complementary shape 57 of the front ends of the cartridge. A correct positioning of the cartridge is thus guaranteed and possible cartridge manufacturing tolerances are compensated.

Figure 6:
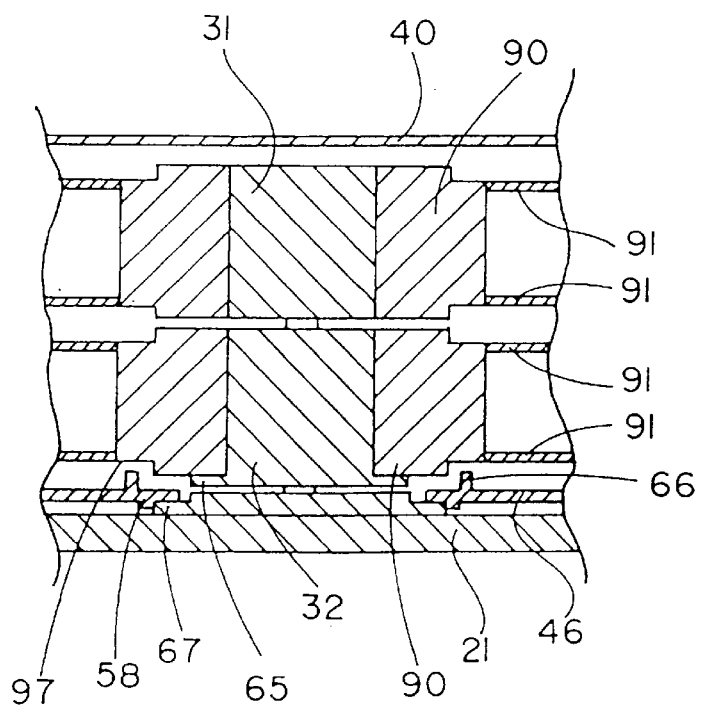
FIG. 6 shows, in axial cross-section, a detail of a cartridge positioned on a housing device according to the present invention.

FIG. 6 illustrates the positioning of cores 90 on main axis 22 when cartridge 40 is in the work position on device 20. Around opening 47, bottom 46 preferably has an external rib 58 intended to cooperate with a shoulder 67 concentric with main axis 22 to participate in the correct positioning of the housing of cartridge 40. With a blocking ensured by grooves 57, it is thus guaranteed that the housing of cartridge 40 does not move when said cartridge is in the work position and, thus, that neither the film, nor the reels, touch the walls of cartridge 40 as the film is unwound.

Core 90 intended to cooperate with portion 32 of axis 22 rests on a shoulder 65 of portion 32 to guarantee an axial spacing between core 90 and bottom 46. Preferably, core 90 includes a peripheral shoulder 97 intended to cooperate with a circular rib 66, protruding from the internal surface of bottom 46 around opening 47, to form an obstacle to the passing of light when cartridge 40 is in a storage position out of the camera.

If axis 22 is motor driven, cores 90 are pivotally connected to respective portions 32 and 31, for example, by means of a stud (not shown) protruding from portions 32 and 31, cooperating with teeth 98 (FIG. 3) on the internal periphery of cores 90.

An advantage of the present invention is that disks 94 for separating flanges 91 participate in the axial positioning of the reels in the work position. Indeed, the camera is generally used while the reels are substantially vertical by being, for example, carried on the shoulder of a user. The reel weight then induces essentially a radial effort on axis 22 and the rigidity of flanges 91 associated with disk 94 is then sufficient to avoid an axial motion of the reels. Blocking means of cores 90 on axis 22, for example magnetic, may also be provided.

Another advantage of the present invention is that it enables using disposable cartridges in a motion picture film camera, without generating noise. Indeed, all elements which are made with a high fitting accuracy and which are not associated with optical block 10 are then associated with device 20. Cartridge 40 only contains the film reels and the cores on which these reels are wound. All the expensive elements of a conventional magazine have thus been, according to the present invention, transferred to housing device 20.

Another advantage of the present invention is that it respects the conventional connections with optical block 10. Thus, device 20 may form, according to the present invention, an adapter, or an interface, enabling the association of a standard cartridge with different optical blocks. In other words, main axis 22 and secondary axes 29 and 30 of a device 20 according to the present invention are made and positioned according to the cartridge 40 for which device 20 is intended. Conversely, rollers 15, 16, 24, and 25, rear presser 12 as well as the drive means of axis 22 are made and positioned according to optical block 10 and to the motor drive means 11 included therein.

FIGS. 7 and 8 illustrate this adaptation function of a housing device according to the present invention. FIG. 7 is an elevation view of a stage 21 according to a first embodiment of a housing device 20. FIG. 8 is an elevation view of a plate 211 according to a second embodiment of a housing device 20'.

The embodiment shown in FIG. 7 is intended to replace a first conventional type of magazine, in which the straightening of the loop of film F is performed by means of a shift pulley 24. It should be noted that FIG. 7 is an alternative of the stage shown in FIG. 1. Indeed, with respect to FIG. 1, the unwinding of the film in front of the filming window is performed in alignment with the reel proximal to stage 21, shift pulley 24 being associated with film extraction idler 42. Conversely, in FIG. 7, shift pulley 24 is associated with film feed idler 43 and the unwinding in front of the filming window is performed in alignment with the reel distal from stage 21, that is, in the upper portion.

In FIG. 7, film F comes out of the cartridge (not shown) through an opening 52 distal from stage 21. The film is returned by idler 42. It is guided to rear presser 12 by means of roller 15 and guided, by means of roller 16, towards roller 25. Roller 25 returns the film to shift pulley 24 for realignment with idler 43 before entering the cartridge.

The embodiment shown in FIG. 8 is intended to replace a second conventional type of magazine in which the straightening of film F is ensured by rear presser 12' itself. Film F is guided by two coaxial pulleys 71 and 72 and rear presser 12' includes opposite and conventional lateral stops 73 and 74 enabling a straightening of film F. Pulleys 71 and 72 are shown with different diameters to better show the path of film F but they may be of same diameter.

In FIGS. 7 and 8, the drive means of axis 22 are schematically shown. These may be, for example, a belt 25 housed in the thickness of stage 21 and driven by a shaft 26 cooperating, for example magnetically, with motor drive means 11 of optical block 10.

As can be seen in FIGS. 7 and 8, it should be noted that the alignment of secondary axes 29 and 30 is not necessarily parallel with rear presser 12. These axes may indeed be shifted according to a parallel to rear presser 12 depending, for example, on the position of the camera control units. It will however be ascertained that the distance (D1, FIG. 8) which separates axis 29 from axis 22 is identical to the distance (D2, FIG. 8) which separates axis 30 from axis 22 when these axes are in the active position.

Other embodiments of the housing device may be provided. An advantage of the present invention is that the structure of the housing device may be adapted to different types of cameras while enabling the use of standard cartridges.

Figure 9:
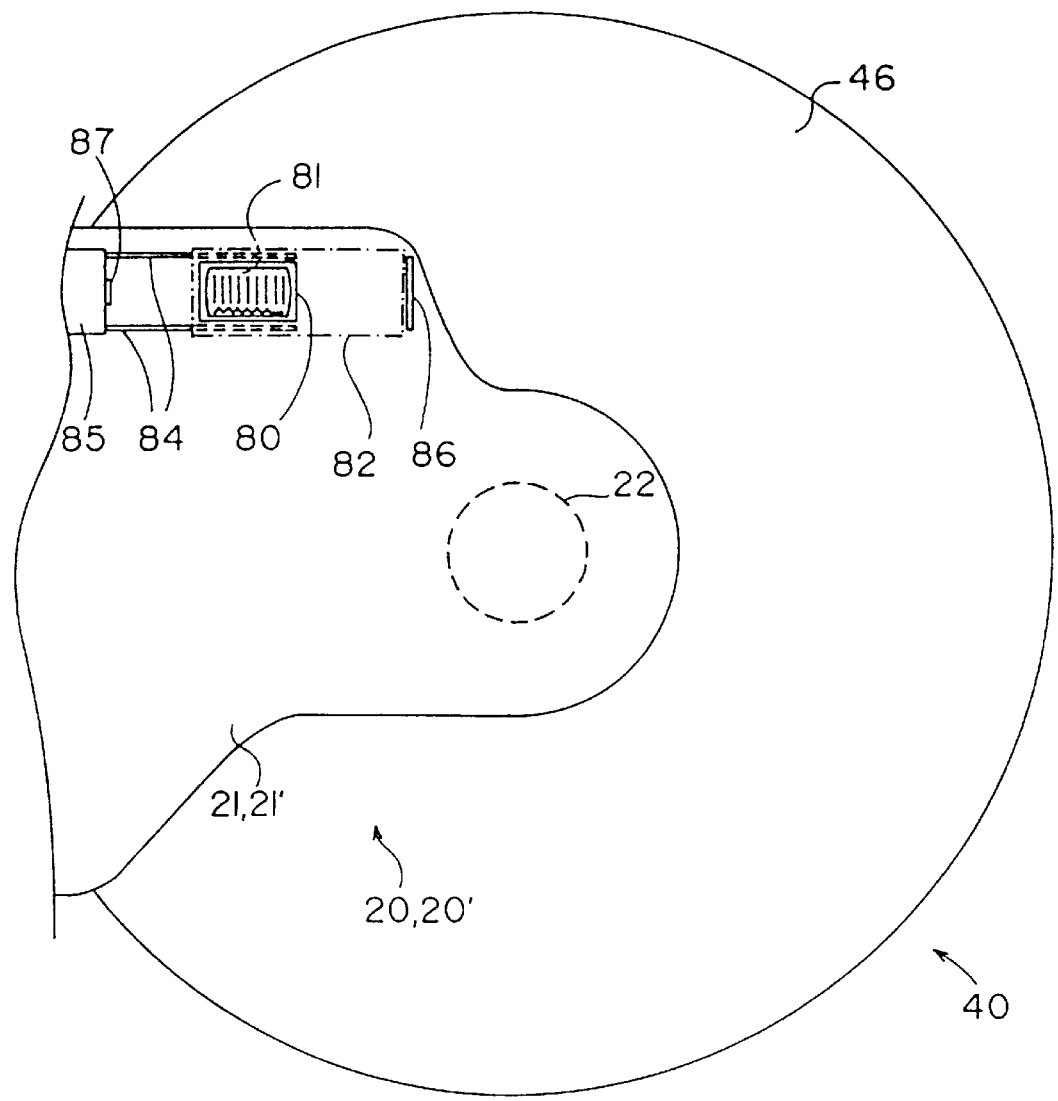
FIG. 9 shows an embodiment of means for identifying a film contained in a cartridge.
Figure 10:
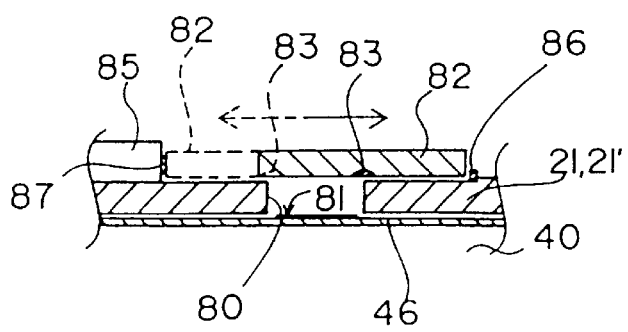
FIG. 10 is a cross-sectional view of a detail of FIG. 9.

FIGS. 9 and 10 illustrate another feature of the present invention which enables the camera to be equipped with identification means of cartridge 40 and of characteristics of the film contained therein. FIG. 9 shows, partially and from the bottom, a housing device 20 or 20', on which a cartridge 40 is mounted. FIG. 10 shows, in cross-section, a detail of FIG. 9.

Stage 21 (or 21') includes, in an area facing bottom 46 of cartridge 40, a port 80. This port is intended to enable the reading, for example, the optical reading, of a label 81 affixed, for example, during the manufacturing of cartridge 40, on its bottom 46. Port 80 is, preferably, made outside the light-tight area defined by the sealing means between stage 21 (or 21') and bottom 46. Label 81 includes, for example, information coded in the form of bars. The reading of the label is performed by means of an optical reading device associated with device 20 (or 20'). This device is, for example, formed of a small rod 82 provided with a reading diode 83. For clarity, rod 82 is shown in stripe-dot lines in FIG. 9. Rod 82 is mounted, for example, on rails 84 protruding from stage 21 (or 21') enabling movement along the longitudinal direction of port 80 between two stops, respectively 85 and 86, to enable a motion of diode 83 along label 81.

According to the present invention, rod 82 is associated with resilient means (not shown) for returning it to an idle position where it is distal from a first stop 85 provided with electronic means (not shown) for interpreting the information read by diode 83. These return means ensure, in a simple manner, a passing of diode 83 in front of label 81, at a substantially regular speed.

Stop 85 includes one or several contacts 87, adapted to cooperate with contacts (not shown) of rod 82, to reset the interpretation means when rod 82 is manually brought to an activation position where it touches stop 85. The idle and active positions of rod 82 are shown in FIG. 10, respectively, in full line and in dotted lines.

When the user slides rod 82 towards its activation position (arrow in dotted lines in FIG. 10), he arms the return means at the same time as he resets the interpretation means. When he frees rod 82, the return means cause a motion of rod 82 towards stop 86 (arrow in full line in FIG. 10) at a substantially regular speed and label 81 is read.

The electric signals of diode 83 transit, from rod 82 to stop 85, for example, by means of rails 84 which may be conductive. In this case, a cover (not shown) preferably covers the read device from stop 85 to above the end of port 80, distal from stop 85. Rails 84 extend from stop 85 to this distal end. Thus, rails 84 are protected, whatever the position of rod 82, while enabling an operation of the rod by the user.

The transfer of the signals required for exploiting the read information is performed by means of electric contacts between housing device 20 (or 20') and optical block 10. If desired, the interpretation means are transferred into the optical block of the camera which is then appropriately electrically connected to stop 85.

The optical reading device may also be transferred onto the cover 60 of housing device 20 (or 20'). In this case, cover 60 includes electric contacts for connection with optical block 10 to ensure the transfer of the different necessary signals.

An advantage of equipping the housing device with such reading means is that it provides the camera with the possibility of identifying the cartridge and the characteristics of the film contained therein. Another advantage, induced by the use of a cartridge, is that it is no longer required from the user to enter these characteristics. Indeed, in the case of a conventional magazine, the magazine is reusable. The user must thus enter, in the magazine, the characteristics relative to the film contained therein. Conversely, since the cartridge is a disposable cartridge, label 81 may include, in coded form, all the film characteristics (length, sensitivity, etc.), as well as an identifier of the cartridge itself. The bar-codes may indeed include a great amount of information. Label 81 is, according to the present invention, affixed during the cartridge manufacturing.

The optical block includes means for storing and exploiting the information contained on label 81. These means are similar to those used in conventional cameras to store and exploit the information entered by the user in the magazine characterization device.

The practical implementation of the optical reading device is within the abilities of those skilled in the art according to the functional indications given hereabove. It should be noted that the optical reading device may be replaced with a system for reading an electronic chip associated with the cartridge.

Of course, the present invention is likely to have various alterations, modifications and improvements which will readily occur to those skilled in the art. In particular, the dimensions of housing device 20 (or 20') depend on the optical block 10 and on the cartridge 40 for which it is intended, and thus on the width of film F and on its maximum length. Further, although the present invention has been described in relation with a camera in which the supply and take-up reels are coaxial, it also applies to the case where these reels are individually supported by two independent main axes, for example positioning the reels in a same plane. The modifications to be brought to the arrangement of the means described hereabove are within the abilities of those skilled in the art.

Such alterations, modifications, and improvements are intended to be part of this disclosure, and are intended to be within the spirit and the scope of the present invention. Accordingly, the foregoing description is by way of example only and is not intended to be limiting. The present invention is limited only as defined in the following claims and the equivalents thereto.

What is claimed is:

1. A device for housing coaxial motion picture film reels, intended to be associated with an optical block of a film camera, including:

a stage for housing said reels and defining a space for means for guiding the film in a loop between said reels and a rear presser, said rear presser intended to face a filming window of the optical block, each of said reels including two circular flanges for axially holding said film around a core of each of said reels;

at least one main axis intended to cooperate with a core of at least one of said reels;

disks for separating said flanges of said reels;

two secondary axes, each of said axes supporting a return idler of said film and supporting said disks for separating said flanges of said reels, said disks for separating said flanges being pivotally mounted on said secondary axes independently from said return idler; and means for defining relative motion between said secondary axes and said reels, said relative motion being between an idle position where said secondary axes are radially distant from said reels and an active position where said disks for separating separate the periphery of said flanges in a determined region, said determined region fixed with respect to said housing device.

2. The housing device of claim 1, wherein each of said secondary axes pivotally supports a return idler axially placed between two disks forming said means for separating, said two disks also pivotally mounted on each of said secondary axes, independently from said return idler.

3. The housing device of claim 2, wherein the diameter of said disks is greater than the diameter of said idler.

4. The housing device of claim 2 or 3, wherein each of said flanges includes, at its periphery, a tapered edge adapted to forming a bearing surface for said disks, the tapered edges of said flanges facing each other.

5. The housing device of claim 2, wherein at least one disk of a reel is motor driven.

6. The housing device of claim 5, wherein at least one return idler is motor driven and includes film traction means.

7. The housing device of claim 4, wherein said main axis is motor driven, and said return idler and said disks rotate freely and independently from one another on said secondary axes.

8. The housing device of claim 7, wherein said reels are contained in a cartridge provided with curtains movable between a closed position where they define slots of communication between the outside and the inside of the cartridge and an open position where they define openings for introducing at least partially said separating disks for separating said flanges.

9. The housing device of claim 8, including operating means, accessible from the outside, for controlling the simultaneous opening and the simultaneous closing of said curtains of said cartridge.

10. The housing device of claim 9, wherein said operating means simultaneously lock a closing cover of the space housing said means for guiding.

11. The housing device of claim 10, including means, accessible from the outside, for controlling radial motions of said secondary axes or of said at least one main axis between the idle and active positions.

12. The housing device of claim 11, removable from said optical block, said means for guiding being formed of rollers supported, at least some of them, by said stage, wherein the realization and the positioning of said rollers supported by said stage depends on said optical block for which said housing device is intended while the position of said at least one main axis and said secondary axes depends on said cartridge for which said housing device is intended.

13. The housing device of claim 12, wherein said reels are coaxial and supported by a single main axis.

14. The housing device of claim 13, further including a device for optically reading a label showing characteristics of said film contained in said cartridge and affixed on an external surface thereof, said stage further including a port arranged to face said label, and an optical reading rod associated with said housing device being adapted to travel in front of said port.

15. A film camera for a motion picture film including an optical block associated with motor drive means for a film drive mechanism including housing means for a removable cartridge containing the film in the form of a first raw film reel and of a second exposed film reel, the reels being coaxial and the housing means including means arranged to cooperate with movable elements contained in the cartridge so that, in a work position, neither the film, nor a movable element with which the film is in contact, is in contact with a fixed element of the cartridge, the housing means being formed by the housing device of claim 14.

* * * * *